US009262313B2

(12) United States Patent
Herron et al.

(10) Patent No.: US 9,262,313 B2
(45) Date of Patent: Feb. 16, 2016

(54) PROVISIONING IN HETEROGENIC VOLUME OF MULTIPLE TIERS

(71) Applicant: Microsoft Corporation, Redmond, WA (US)

(72) Inventors: Andrew Herron, Redmond, WA (US); Sarosh Cyrus Havewala, Kirkland, WA (US); Karan Mehra, Sammamish, WA (US); Ankur Kasturiya, Issaquah, WA (US); Shiv Rajpal, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 168 days.

(21) Appl. No.: 13/829,363

(22) Filed: Mar. 14, 2013

(65) Prior Publication Data

US 2014/0281227 A1 Sep. 18, 2014

(51) Int. Cl.
*G06F 3/06* (2006.01)
*G06F 12/02* (2006.01)

(52) U.S. Cl.
CPC .............. *G06F 12/02* (2013.01); *G06F 3/0605* (2013.01); *G06F 3/067* (2013.01); *G06F 3/0631* (2013.01); *G06F 3/0665* (2013.01); *G06F 3/0689* (2013.01)

(58) Field of Classification Search
CPC .................................................... G06F 3/0665
See application file for complete search history.

(56) References Cited

U.S. PATENT DOCUMENTS

| | | | |
|---|---|---|---|
| 5,287,500 A * | 2/1994 | Stoppani, Jr. ................. | 711/211 |
| 7,441,096 B2 | 10/2008 | Kitamura | |
| 7,640,274 B2 | 12/2009 | Tinker et al. | |
| 8,051,243 B2 | 11/2011 | Murase | |
| 8,229,897 B2 | 7/2012 | Cannon et al. | |
| 8,271,757 B1 | 9/2012 | Chatterjee et al. | |
| 8,285,758 B1 | 10/2012 | Bono et al. | |
| 8,290,972 B1 | 10/2012 | Deshmukh et al. | |
| 8,352,429 B1 | 1/2013 | Mamidi et al. | |
| 8,356,147 B2 | 1/2013 | Kawaguchi | |
| 8,566,546 B1 * | 10/2013 | Marshak et al. .............. | 711/165 |

(Continued)

FOREIGN PATENT DOCUMENTS

WO  WO 2009102425 A1  8/2009

OTHER PUBLICATIONS

"International Search Report & Written Opinion for PCT Patent Application No. PCT/US2014/023599", Mailed Date: Jun. 25, 2014, Filed Date: Mar. 11, 2014, 8 pages.

(Continued)

*Primary Examiner* — Jared Rutz
*Assistant Examiner* — Charles Choi
(74) *Attorney, Agent, or Firm* — Sunah Lee; Raghu Chinagudabha; Micky Minhas

(57) ABSTRACT

The provisioning of a volume that has multiple tiers corresponding to different trait sets. The volume to be provisioned is identified along with multiple tiers that are to be in the volume. For each of the tiers that are to be provisioned within the volume, a corresponding trait set is identified as to be applied to each tier. This corresponding trait set may be based on underlying storage systems that are available at the time of provisioning, or which are anticipated to be available. The volume is then caused to be provisioned with the corresponding tiers having the corresponding trait sets. Also, the provisioning of a file, which is determined to have one or more storage traits. Based on these storage traits, the file is then caused to be assigned to an appropriate tier.

19 Claims, 11 Drawing Sheets

(56) References Cited

U.S. PATENT DOCUMENTS

| | | | |
|---|---|---|---|
| 8,583,838 B1* | 11/2013 | Marshak et al. | 710/18 |
| 8,639,665 B2 | 1/2014 | Berman et al. | |
| 8,732,217 B2 | 5/2014 | Mamidi et al. | |
| 8,868,797 B1* | 10/2014 | Kirac et al. | 710/15 |
| 8,874,850 B1 | 10/2014 | Goodson et al. | |
| 2006/0010169 A1 | 1/2006 | Kitamura | |
| 2007/0038749 A1* | 2/2007 | Noya et al. | 709/226 |
| 2007/0185934 A1 | 8/2007 | Cannon et al. | |
| 2008/0177948 A1 | 7/2008 | Mimatsu | |
| 2009/0077097 A1 | 3/2009 | Lacapra et al. | |
| 2009/0157756 A1 | 6/2009 | Sanvido | |
| 2010/0332452 A1 | 12/2010 | Hsu et al. | |
| 2011/0072225 A1* | 3/2011 | Kawaguchi et al. | 711/162 |
| 2011/0106863 A1 | 5/2011 | Mamidi et al. | |
| 2011/0231631 A1 | 9/2011 | Matsuzawa et al. | |
| 2012/0011329 A1* | 1/2012 | Nonaka | 711/154 |
| 2012/0047346 A1* | 2/2012 | Kawaguchi | 711/165 |
| 2012/0131293 A1 | 5/2012 | Benhase et al. | |
| 2012/0290779 A1 | 11/2012 | Eleftheriou et al. | |
| 2012/0303929 A1 | 11/2012 | Chiu et al. | |
| 2013/0024650 A1 | 1/2013 | Ambat et al. | |
| 2013/0036280 A1* | 2/2013 | Futawatari et al. | 711/162 |
| 2013/0054932 A1 | 2/2013 | Acharya et al. | |
| 2013/0073821 A1 | 3/2013 | Flynn et al. | |
| 2013/0238867 A1* | 9/2013 | Hayashi | 711/162 |
| 2014/0297909 A1 | 10/2014 | Aiura et al. | |

OTHER PUBLICATIONS

U.S. Appl. No. 13/829,276, filed Mar. 14, 2013, Rajpal et al.

U.S. Appl. No. 13/829,245, filed Mar. 14, 2013, Rajpal et al.

U.S. Appl. No. 13/829,314, filed Mar. 14, 2013, Christiansen et al.

"International Search Report & Written Opinion for PCT Patent Application No. PCT/US2014/023366", Mailed Date: Jun. 24, 2014, Filed Date: Mar. 11, 2014, 8 pages.

"International Search Report & Written Opinion for PCT Patent Application No. PCT/US2014/023219", Mailed Date: Jun. 26, 2014, Filed Date: Mar. 11, 2014, 8 pages.

"Content Management without Boundaries", Published on: Aug. 7, 2011, Available at: http://www.oracle.com/us/products/servers-storage/storage/tape-storage/oracle-br-ecm-storage-209502.pdf.

"Enabling the Virtual Data Center", Published on: Aug. 27, 2010, Available at: http://i.dell.com/sites/content/business/smb/sb360/en/Documents/wp-enabling-dc.pdf.

Simpson, Dave, "Isilon Puts Multiple Tiers under One File System", Published on: Jun. 29, 2010, Available at: http://www.infostor.com/index/articles/display/2125168308/articles/infostor/nas/2010/june-2010/isilon-puts_multiple.html.

U.S. Appl. No. 13/829,276, Rajpal, et al., "Heterogenic Volume Generation and Use System", filed Mar. 14, 2013.

"Infinity Storage", Published on: Jul. 13, 2012, Available at: http://www.infinity-storage.com/product-overview.html.

"Veritas Storage Foundation™ Intelligent Storage Provisioning Solutions Guide", Published on: Jan. 23, 2007, Available at: http://sfdoccentral.symantec.com/sf/5.0/hpux/pdf/sf isp_solutions.pdf.

"Automated Storage Tiering", In White Paper of Point Software & Systems Gmbh, Retrieved on: Apr. 11, 2013, 16 pages.

Office Action dated Nov. 21, 2014 cited in U.S. Appl. No. 13/829,314.

Office Action dated Nov. 28, 2014 cited in U.S. Appl. No. 13/829,276.

Office Action dated Jan. 30, 2015 cited in U.S. Appl. No. 13/829,245.

International Search Report & Written Opinion for PCT Patent Application No. PCT/US2014/023315, Mailed Date: Nov. 25, 2014, Filed Date: Mar. 11, 2014, 9 pages.

Notice of Allowance dated Apr. 24, 2015 cited in U.S. Appl. No. 13/829,314.

Office Action dated May 7, 2015 cited in U.S. Appl. No. 13/829,276.

Notice of Allowance dated May 18, 2015 cited in U.S. Appl. No. 13/829,245.

Office Action dated Oct. 5, 2015 cited in U.S. Appl. No. 13/829,276.

* cited by examiner

PROVISIONING IN HETEROGENIC VOLUME OF MULTIPLE TIERS

BACKGROUND

Computing systems obtain a high degree of functionality by executing software programs. Computing systems use storage hierarchies in order to store such software programs and other files. At the lowest level of a local storage hierarchy might be a disk, such as a mechanical disk, optical disk and the like. Higher up in the storage hierarchy might be devices such as solid-state disks or non-volatile memory and the like.

Computing systems operate most efficiently when the most in demand blocks of data are located high in the storage hierarchy, wherein the lesser demanded blocks of data might be located lower in the storage hierarchy. The decision on where to place blocks of data within the storage hierarchy conventionally takes place below the file system.

The file system itself typically has no visibility on this storage hierarchy, but instead views storage in the form of a volume. A volume is a single logical namespace visible to the file system. A volume may be provisioned to be a certain size and often corresponds to the boundaries of an underlying storage device. For instance, a disk may be a single volume, or perhaps be partitioned into multiple volumes. Furthermore, a volume may be made up of multiple disks. The file system may then structure directories within the volume, and save files into the namespace, either at the root directory of the namespace, or within one of the directories of the namespaces.

A single volume may have particular traits. For instance, a volume might be set up to be mirrored and thus have a certain level of built-in redundancy. A volume might also be set up to be encrypted or compressed. Conventionally, the traits are set up on a per-volume basis. Thus, the file system itself views any block of storage within that volume to have the same traits as any other block of storage within that volume, and relegates any decisions regarding how blocks are placed to the storage system that is abstracted from the file system view.

BRIEF SUMMARY

At least some embodiments described herein relate to the provisioning of a volume that has multiple tiers corresponding to different trait sets. The volume to be provisioned is identified along with multiple tiers that are to be in the volume. For each of the tiers that are to be provisioned within the volume, a corresponding trait set is identified as to be applied to each tier. In the case of thick provisioning, this corresponding trait set is based on underlying storage systems that are available at the time of provisioning. In the case of thin provisioning, the corresponding trait set is based on underlying storage systems, at least some of which being anticipated to become available at some point after the provisioning. In any case, as part of the provisioning process, the volume is caused to be provisioned with the corresponding tiers having the corresponding trait sets.

At least some embodiments described herein relate to the provisioning of a file, which is determined to have one or more storage traits. Based on these storage traits, the file is then caused to be assigned to an appropriate tier supported by underlying storage systems having storage of appropriate traits. The provisioning might also include anticipate future failure conditions, and detecting current failure conditions, and allow an appropriate response on a per-tier basis without necessarily affecting the remainder of the volume.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the provisioning of a volume that has multiple tiers corresponding to different trait sets is described. The volume to be provisioned is identified along with multiple tiers that are to be in the volume. For each of the tiers that are to be provisioned within the volume, a corresponding trait set is identified as to be applied to each tier. This corresponding trait set may be based on underlying storage systems that are available at the time of provisioning, or which are anticipated to be available. The volume is then caused to be provisioned with the corresponding tiers having the corresponding trait sets. Also described is the provisioning of a file, which is determined to have one or more storage traits. Based on these storage traits, the file is then caused to be assigned to an appropriate tier. The provisioning may also assist in monitoring the volume usage, and promote certain response when potential failure conditions have occurred, or may occur.

Some introductory discussion of a computing system will be described with respect to FIG. 1. Then, a broad view of a system in which a multi-tier volume may be provisioned, offered up, and used, will be described with respect to FIG. 2. A mechanism for creating and exposing up a multi-tier volume will then be described with respect to FIGS. 3 and 4. The file system usage of such a multi-tier volume will then be described with respect to FIGS. 5 and 6. Finally, example provisioning and monitoring operations in accordance with the principles described herein will be described with respect to FIGS. 7 through 12.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
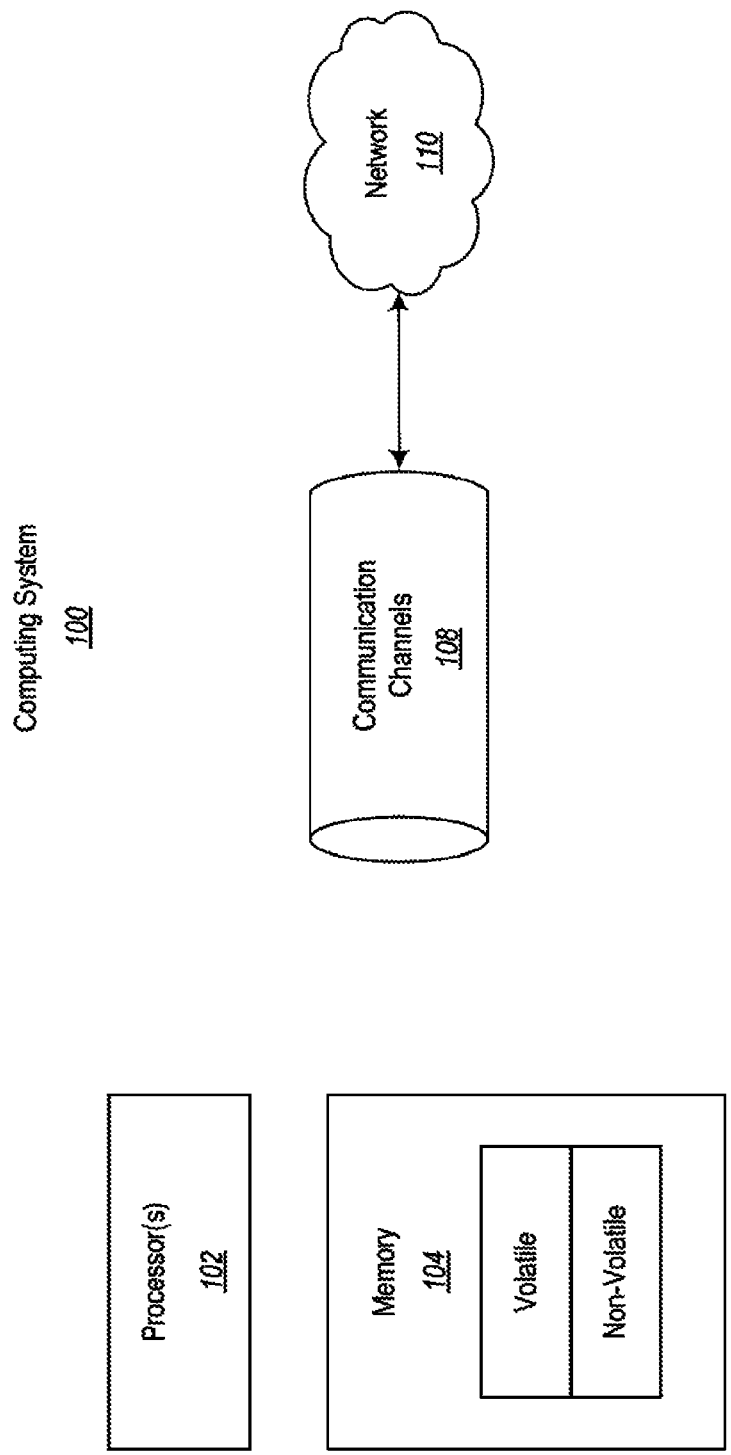
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

A broad view of a system in which a multi-tier volume may be provisioned, offered up, and used, will now be described with respect to FIG. 2. Thereafter, a mechanism for creating a multi-tier volume will be described with respect to FIGS. 3 and 4. The file system usage of such a multi-tier volume will then be described with respect to FIGS. 5 and 6. Finally, example provisioning and monitoring operations in accordance with the principles described herein will be described with respect to FIGS. 7 through 12.

Figure 2:
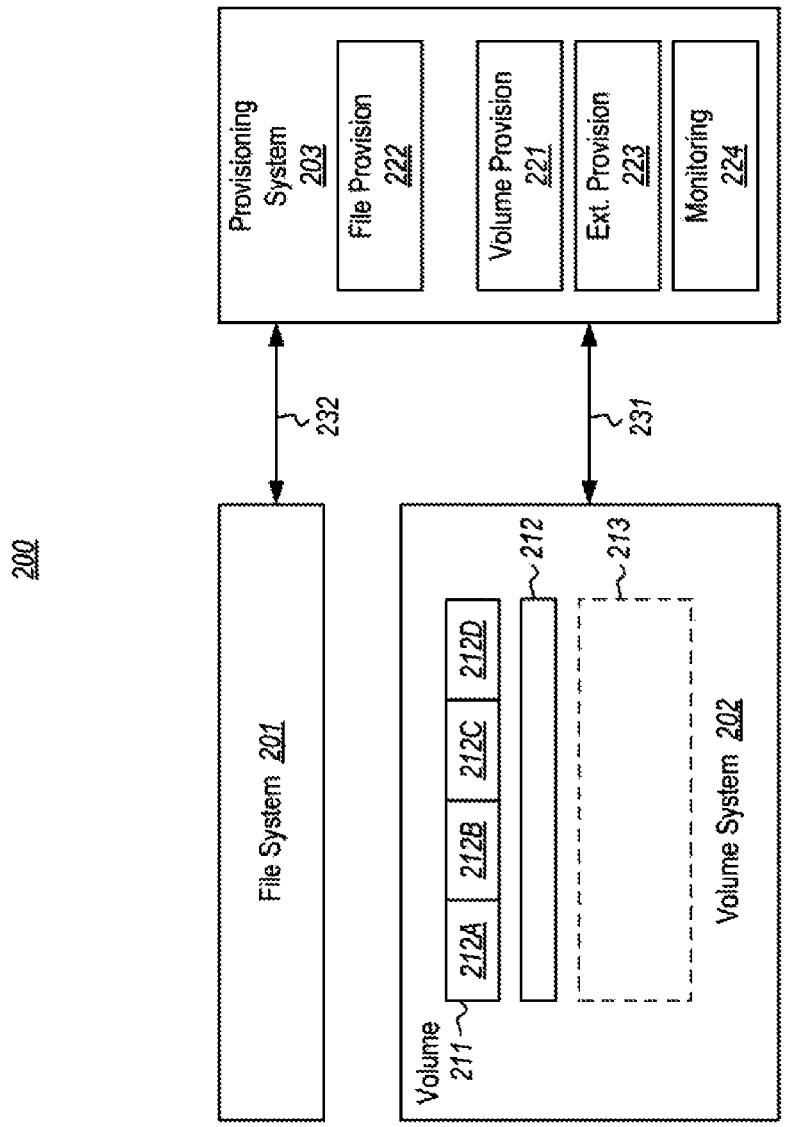
FIG. 2 illustrates a system that includes a volume system that generates and exposes a heterogenic volume having multiple tiers to a file system, and including a provisioning and monitoring system.

FIG. 2 illustrates a system 200 that comprises a file system 201, a volume system 202 and a provisioning system 203. The volume system 202 exposes up a volume 211 to the file system 201 in a manner that the volume has multiple tiers, each tier corresponding to a different storage trait set. Thus, the volume 211 is a heterogenic volume, composed of different tiers of different storage types. For instance, volume 211 is illustrated as having tiers 212A, 212B, 212C and 212D.

The system 200 may be, for example, implemented in the computing system 100 of FIG. 1. If that is the case, the file system 201, the volume system 202 and the provisioning system 203 may be created and/or operated in response to the processor(s) 102 of the computing system 100 executing computer-executable instructions. For instance, such computer-executable instructions may be stored on a computer-readable media, such as a computer-readable storage media that are included within a computer program product.

The file system 201 stores file system namespaces (such as files and directories) in a particular tier of the heterogenic volume 211 based on storage traits to be applied to the file system namespace item. The volume system 202 includes mapping system 212 that maps logical storage addresses of the volume to physical address locations of underlying storage systems 213 in a manner that supports the traits set for each of the tiers of the heterogenic volume.

The system 200 also includes a provisioning system 203 that provides a number of provisioning and monitoring functions. For instance, the provisioning system 203 includes a volume provisioning component 221 that facilitates provisioning of the volume (such as volume 211) to have multiple tiers (such as tiers 212A, 212B, 212C and 212D). Communications 231 with the volume system 202 act to complete the provisioning of the volume.

The provisioning system 203 also may include a file system namespace provisioning component 222 that communicates with the file system using communications 232 in order to provision files or directories as they are created. In particular, the provisioning assists in the determination of storage trait sets to be applied to the file system namespace.

The provisioning system 203 also includes a tier extension component 223 that helps to extend the tiers via communications 231. A monitoring component 224 monitors performance and/or usage of the volume, and takes appropriate action if performance deteriorates, or a failure condition is encountered, or is approaching.

An example volume system 202 will first be described with respect to FIGS. 3 and 4. Then, an example file system 201 will be described with respect to FIGS. 5 and 6. Finally, an example operation of the provisioning system 203 will be described with respect to FIGS. 7 through 12.

Figure 3:
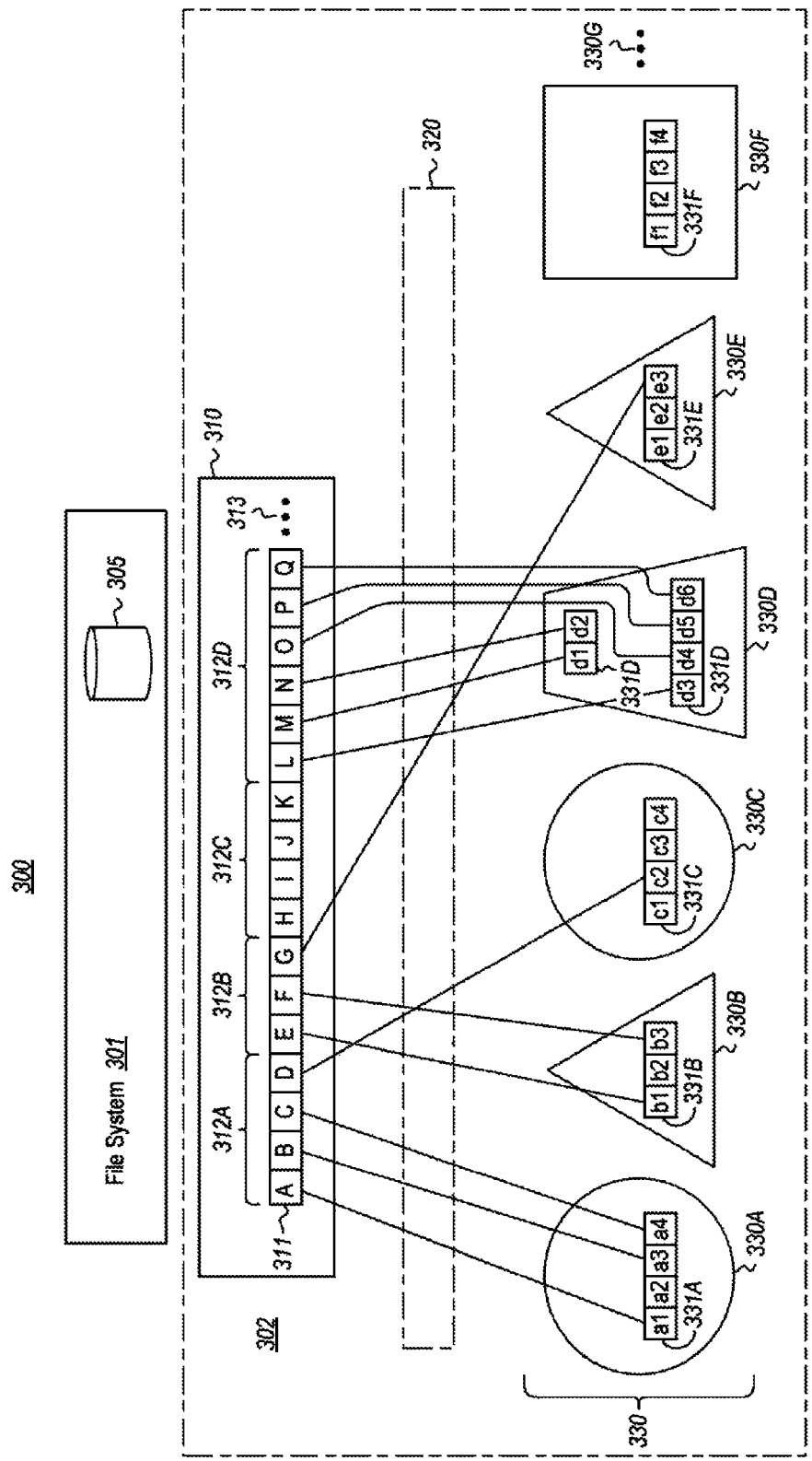
FIG. 3 illustrates a computing environment in which a volume system uses a volume exposure system to expose a volume up to a file system, the volume having multiple tiers of storage having different traits.

FIG. 3 illustrates a computing environment 300 in which a volume system 302 uses a volume exposure system 310 to expose a volume 311 up to a file system 301. The file system 301, the volume system 302 and the volume 311 of FIG. 3 are respectively examples of the file system 201, the volume system 202 and the volume 211 of FIG. 2.

The volume 311 consists of storage represented in the form of an extent of preferably contiguous logical addresses. In this description and in the claims, a "volume" is defined as any group of one or more logical address extents that is presented to a file system in the form of a single namespace. When the file system 301 issues a read or write request to the volume system 302, the file system request includes a logical address. The volume system 302 is configured to recognize the part of the volume 311 that is being addressed using the logical address provided by the file system 301. Thus, from the file system 301 point of view, the file system 301 has access to the entire volume 311 logically addressable throughout the entire extent of the volume 311.

However, unlike a conventional volume, not all storage locations in the volume 311 have the same traits. Thus, the volume 311 may be viewed as a heterogenic volume, being composed of portions that have different traits. This heterogenic feature is supported by a mapping system 320 that maps each of at least some of the logical storage locations of the volume 311 to a corresponding physical storage location in underlying storage systems 330. The mapping system 320 and the storage systems 330 of FIG. 3 are respectively examples of the mapping system 212 and the storage systems 213 of FIG. 2. In FIG. 3, each of the underlying storage systems 330 are illustrated as having a particular shape, which symbolizes a distinct trait set of the storage offered by the corresponding underlying storage system.

For instance, storage systems 330A and 330C are both illustrated as circles, representing that these storage systems provide storage having a common trait set. Storage systems 330B and 330E are illustrated as triangles, representing that these storage systems provide storage having a common trait set with each other, which trait set is different than that of storage systems 330A and 330C. Storage system 330D is shown as a trapezoid, representing that this storage system provides storage that has a trait set that is different than that of any of the other storage systems. Storage system 330F is shown as a square, representing that this storage system provides storage that has a further different trait set that is different than that of any of the other storage systems.

The underlying storage systems 330 are illustrated as including six storage systems 330A through 330F having four different trait sets (symbolically represented by the circle, the triangle, the trapezoid, and the square). However, the ellipses 330G represent that the underlying storage systems 330 may include any number of storage systems, whether more, whether equal to, or whether less than the number of storage systems illustrated in FIG. 3, so long as there are at least two storage systems that collectively offer storage having different trait sets. The mapping system 320 takes advantage of the different trait sets in order to offer up the heterogenic volume 311 to the file system.

At this point, some terminology will be described. In this description and in the claims, a "trait set" is described as a collection of one or more traits. Thus, a single trait may be considered to itself be a "trait set". Examples of traits of storage will be described in further depth below. Furthermore, when a storage system is described as offering storage having a trait set, that is not to say that there are not more traits beyond the trait set that are offered by the storage. Also, a given trait set (say a "first trait set") is "different than" another trait set (say a "second trait set") if the first trait set includes at least one trait that is not included in the second trait set, or if the second trait set includes at least one trait that is not included in the first trait set. Thus, there are cases in which the first trait set and the second trait set share one or more common traits, and yet they could still be different trait sets in accordance with this definition.

The term "physical" storage location or "physical" address will often be used to reference a storage location or address, respectively, in the underlying storage systems 330. This is done merely to distinguish the addressing scheme (i.e., "logical addressing scheme") used by the file system 301 when addressing the heterogenic volume 311 from the addressing scheme (i.e., "physical addressing scheme") used by the underlying storage system 330 to access storage offered by the corresponding underlying storage system. For instance, the file system 301 uses "logical" addresses to address the storage within the volume 311. However, the storage systems 330A through 330F use "physical" addresses to access the respective storage locations 331A through 331F.

However, this is not to imply that the underlying storage system is itself necessarily a physical device or system, although that may be the case. For instance, there may be one or more further levels of mapping abstraction that separate even the underlying storage system from the actual physical storage medium. As an example, the underlying storage system might be physical storage systems such as flash memory, solid-state disks, mechanical disks and so forth. However, the storage system might also be some type of consolidated storage system that offers up addresses that are mapped to further underlying storage systems. Furthermore, there may be one or more transforms (such as encryption or compression) that the storage system applies to the data prior to storing to a given storage location, and one or more reverse transforms (such as decryption or decompression) that the storage system applies to the data after reading data from the given storage location.

The clarification of definitions will now turn to granularity in the size of storage locations. In FIG. 3, the most refined illustrated granularity of storage locations (hereinafter referred to as a "slab") represents the basic unit that the mapping system 320 works with in order to map storage locations. Each slab represents contiguous address locations (e.g., contiguous logical blocks) in the logical addressing scheme recognized by the file system 301. In order to simplify the mapping 320, each slab may also represent contiguous address locations in the physical addressing scheme, although not strictly required.

For instance, in FIG. 3, the volume 311 is illustrated as including 17 slabs labeled as "A" through "Q". The exact number and size of the slabs in the volume is not critical to the principles described herein. Smaller slabs have the advantage of having more fine-grained control over the boundaries between storage of different trait sets in the volume, but have the disadvantage of increasing the number of mappings that the mapping system 320 keeps track of. Thus, the size of the slabs will be a design choice that depends on the balance of these advantages and disadvantages in the context of the specific implementation of the volume system 310. In one embodiment, the slabs are over one hundred megabytes. That may seem quite large, but if a volume is provided in the terabytes range, the mapping system 320 would still track numerous thousands of slab mappings. Thus, FIG. 3 represents a simplified system for the benefit of clearly explaining the principles described herein. Other selections for slab size might be a megabyte or above, although not required.

Having the slabs be of fixed size simplifies the mapping operation, although such is not required under the broader aspects described herein. For instance, a given slab might have a binary multiple of some constant in size. Suppose, for example, that the smallest slab (and thus the constant) is 100 megabytes. The mapping system might track slabs that are also 200 megabytes, 400 megabytes, 800 megabytes, 1.6 Gigabytes and so forth. Although this does increase the complexity of the mapping algorithm, it could also reduce the number of actual mappings that need to be tracked, while still allowing fine-grained control over the location of region boundaries.

Each of the physical storage locations 331A through 331F also have slabs that represent the basic unit of the mapping. For instance, in this example, physical storage locations 331A include slabs a1 through a4, physical storage locations 331B include slabs b1 through b3, physical storage locations 331C include slabs c1 through c4, physical storage locations 331D include slabs d1 through d6, physical storage locations 331E include slabs e1 through e3, and physical storage locations 331F include slabs f1 through f4. Of course, this example is greatly simplified for the benefit of the reader. Depending on the slab size, each underlying storage system 330 might more beneficially include hundreds, thousands, or even millions of slabs. Hereinafter, a slab in the volume 311 might also be referred to as a "volume slab", while a slab in the underlying storage system might also be referred to as a "storage slab".

A volume slab is "thickly provisioned" if the mapping system 320 maps that volume slab to a specific storage slab in the underlying storage system. For instance, volume slabs A through G are thickly provisioned as the mapping system 320 maps them to respective storage slabs a1, a3, a4, c2, b1, b3 and e3 in the underlying storage systems 330. Likewise, volume slabs L through Q are thickly provisioned as the mapping system 320 maps them to respective slabs d3, d1, d2, d4, d5 and d6 of the underlying storage systems 330.

A volume slab is "thinly provisioned" if the mapping system 320 does not map the volume slab to a specific storage slab in the underlying storage system until the volume slab is needed by the file system. For instance, volume slabs H through K are not mapped by the mapping system 320 to any underlying storage, although the mapping system 320 may be aware that storage slabs f1 through f4 of storage system 330F are available for proper mapping once any of the volume slabs H through K are actually used to store data.

In this description and in the claims, a "region" is defined as a set of one or more slabs that are contiguous in the logical addressing scheme of the volume (e.g., volume 311) presented to the file system (e.g., file system 301). For instance, volume 311 is illustrated as including first region 312A, second region 312B, third region 312C and fourth region 312D. However, the principles described herein are not limited to the number of regions within a volume, and an example will even be described further below in which the number of regions has increased.

Each region corresponds to a common trait set (also referred to as a "region trait set") that is "consistent with" the trait set offered by the underlying storage system(s) to which the constituent volume slabs are mapped. For instance, the first region 312A has a trait set (hereinafter referred to as a "first region trait set") that is consistent with the trait set of the supporting storage offered by the storage systems (e.g., 330A and 330C represented as circles) that have slabs that are mapped to the constituent volume slabs A through D. A region trait set is "consistent with" a storage trait set if the region trait set is either 1) the same as the storage trait set, or 2) a subset of the storage trait set with any excess traits offered by the underlying storage (beyond those in the region trait set) not being incompatible with any of the traits within the region trait set.

The second region 312B has a second region trait set that is consistent with the trait set of the supporting storage offered by the storage systems (e.g., 330B and 330E represented by triangles) that have slabs that are mapped to the constituent volume slabs E through G. The third region 312C has a third region trait set that is consistent with the trait set of the storage offered by the storage system 330F. Accordingly, the mapping system 320 is ready to map any of volume slabs H through K of region 312C to any of storage slabs f1 through f4 of storage system 330F (represented by a square) once a write operation is detected on the volume slabs H through K. The fourth region 312D has a fourth region trait set that is consistent with the trait set of the supporting storage offered by the storage system (e.g., 330D represented by a trapezoid) that have slabs that are mapped to the constituent volume slabs L through Q.

A region is defined as "thickly provisioned" if all of its constituent volume slabs are thickly provisioned. A region is defined as "thinly provisioned" if all of its constituent volume slabs are thinly provisioned. Thus, regions 312A, 312B and 312D are thickly provisioned, whereas region 312C is thinly provisioned in FIG. 3.

A "tier" is defined as a set of one or more regions having a common region trait set. A given region in the tier need not be contiguous with any other region within the tier. In the case of FIG. 3, each of the regions 312A through 312D have a different region trait set. There are no tiers in FIG. 3 which have more than one region. Accordingly, there are also four tiers in FIG. 3. A first tier includes only first region 312A and has a trait set (hereinafter referred to as a "first tier trait set") that is the same as the first region trait set. A second tier includes only second region 312B and has a trait set (hereinafter referred to as a "second tier trait set") that is the same as the second region trait set. A third tier includes only third region 312C and has a trait set (hereinafter referred to as a "third tier trait set") that is the same as the third region trait set. A fourth tier includes only fourth region 312D and has a trait set (hereinafter referred to as a "fourth tier trait set") that is the same as the fourth region trait set. In an example provided below with respect to FIG. 4, a fifth region (412E) is added in order to extend the first tier. However, for the description of FIG. 3, first through fourth regions correspond one-to-one to first through fourth tiers. The first, second, third, and fourth tiers mentioned in this paragraph are examples of the tiers 212A, 212B, 212C and 212D of FIG. 2.

A tier is defined as "thickly provisioned" if its constituent region(s) is/are all thickly provisioned. A tier is defined as "thinly provisioned" if its constituent region(s) is/are thinly provisioned. Thus, the first, second and fourth tiers are thickly provisioned, whereas the third region is thinly provisioned in FIG. 3. A tier might be thickly provisioned or thinly provisioned when initially set up in response to a provisioning instruction.

The file system 301 includes metadata 305 about the volume 311 such as the size of the volume, and the size and logical storage location(s) of each of the tiers. The metadata 305 might also include the tier trait set of each of the tiers. The metadata 305 may, for example, be persisted. The file system 301 may use this metadata 305 to make decisions regarding where to place a file system namespace (such as a directory or file), or a portion thereof, into the volume 311.

The ellipses 313 represent that the volume exposure system 310 may offer up more volumes to file systems. The additional volumes may also be heterogenic and may use the same underlying storage systems. For instance, in FIG. 3, the slabs a2, b2, c1, c3, c4, e1, e2, f1, f2, f3 and f4 are each illustrated as being unmapped in the case of there being only volume 311 that is being exposed up. Accordingly, these unmapped slabs are available to the volume exposure system 310 to construct one or more additional volumes (not shown) using the same principles described with respect to the construction of the first volume 311.

Any trait in any given trait set may be any trait that might have any relevance to a file system or other decision making logic in determining an effective tier in which to place a file system namespace (such as a directory or file system). Examples will now be provided, though this enumeration of examples is but a small sampling of possible relevant traits.

One example of a trait might be an actual type of underlying storage system. For instance, the type trait might specify flash memory, disk device, cloud storage, or any other type of storage system. The type trait might also specify broader categories such as solid state storage that involves no mechanically interacting pieces, or mechanism storage that has one or more mechanically interacting pieces.

A trait might also be a performant trait which relates to the performance of the storage. For instance, a read/write performant trait relates to the performance of the storage when performing read/write operations. For instance, read/write performant traits might be a function of latency (read and/or write), data transfer speed (read and/or write), or the like.

The performant trait might also be a transience performant trait, which might be a function of the likelihood that any given bit will flip in the storage over a given time period. For instance, the transience performant trait might indicate that the storage is capable of safely storing data for a certain number of days, weeks, or years. The transience performant trait might be a function of the number of expected write operations that a given size of storage can be expected to endure before subsequent writes are deemed unreliable or not possible. For instance, the storage might have a maximum of 10, 100 or 1000 write operations. The transience performant trait might also specify whether or not the storage is volatile or non-volatile.

A trait might be a resiliency trait that relates to a level of redundancy built into the storage. For instance, some storage might be 2-way mirrored, which is offered to survive failure of a single physical storage device. Some storage might have higher levels of redundancy surviving failure of more than one physical device, and the resiliency trait might specify a minimum level of redundancy.

The trait might also indicate whether or not the storage is remote-replicated, which involves keeping a copy of the data in a remote location.

A trait might also be related to an encryption property. For instance, the storage system might have hardware and/or software than encrypts data prior to storage, and decrypts the data after reading from storage, thus securely storing the data whilst allowing the file system to operate on the data in the clear. The encryption trait might also specify a minimum security of the encryption, such as whether 128 bit encryption is required.

The trait might also be a compression trait in which case the storage system has hardware and/or software to compress data prior to writing to storage, and decompress the data after reading from storage, thus storing the data in compressed form whilst allowing the file system to operate on the uncompressed data. The compression trait might also represent whether the compression must be lossless, or whether some level of lossy compression is acceptable, and if so, what level of lossy compression is acceptable.

A trait might also include the presence of absence of a seek penalty for the storage system. If a seek penalty is present, the trait might also specify characteristics of that seek penalty. A trait set might also include power consumption properties of the underlying storage.

A trait set for a given tier may include any one or more of these enumerated traits or additional traits not enumerated, or combinations thereof.

Figure 4:
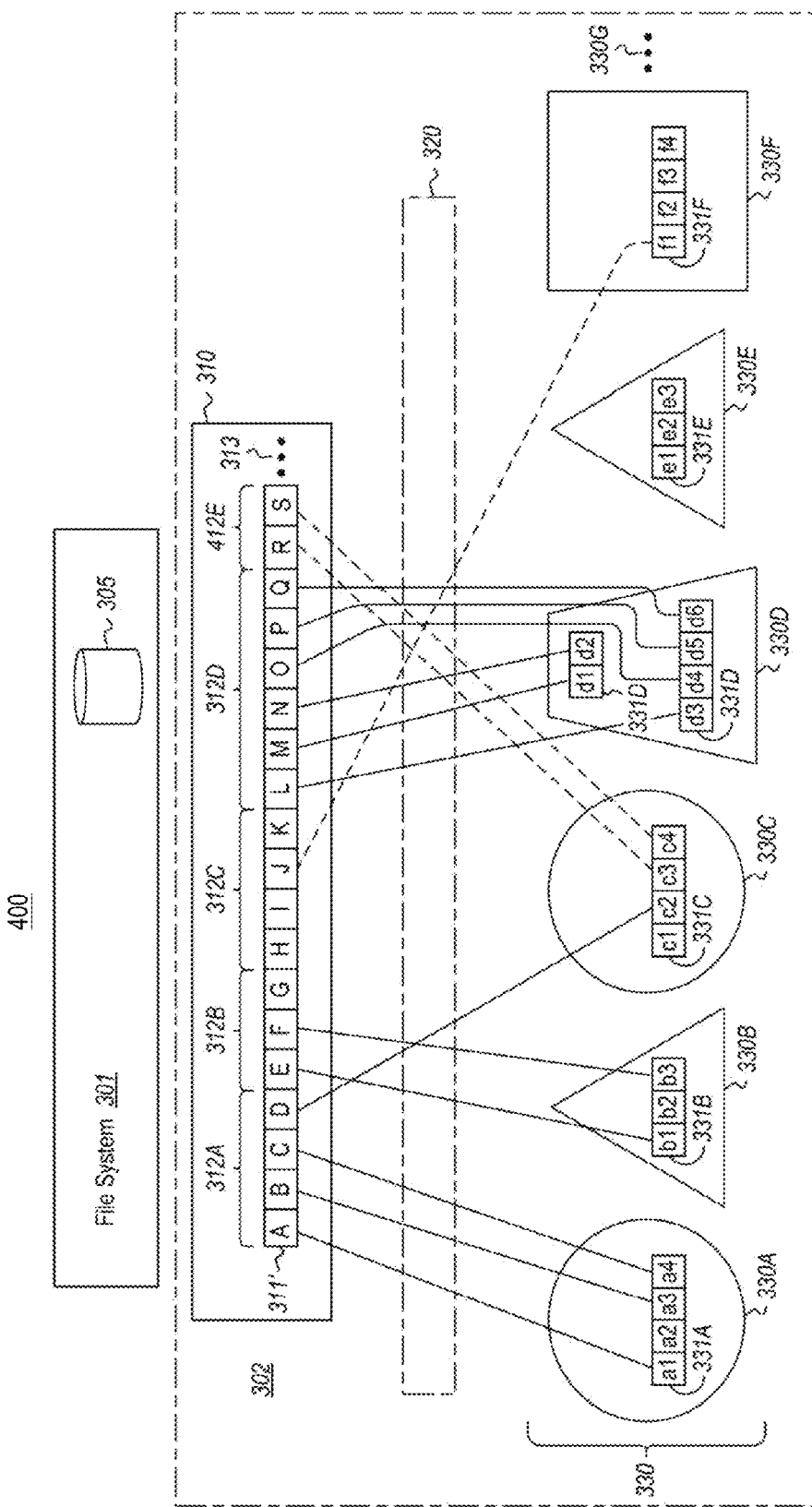
FIG. 4 illustrates a computing environment that is similar to the computing environment of FIG. 3, except that a volume slab that was thinly provisioned in FIG. 3 is now thickly provisioned, and in that the computing system extends the volume.

FIG. 4 illustrates an environment 400 that extends on the example of FIG. 3 and illustrates a number of happenings since the situation of FIG. 3. For one, the mapping system 320 now illustrates a mapping of volume slab J to storage slab f1. Thus, at some point, the file system 301 wrote to some logical address space within the slab J, causing the mapping system 320 to react by formulating an actual mapping to an underlying storage slab that supports the traits of the region 312C. Thus, in the state of FIG. 4, third region 312C, third tier, and volume 311' of FIG. 4 may be viewed as "partially thickly provisioned". A region, tier, or volume is "partially thickly provisioned" if there is at least one volume slab contained therein that is thickly provisioned, and at least one volume slab that is thinly provisioned.

Another happening is that the volume 311 of FIG. 3 has been extended by the volume exposure system 310 to form an extended volume 311' which includes a fifth region 412E having two volume slabs R and S. The fifth region 412E extends the first tier, previously including only first region 312A. Accordingly, now the first tier includes two regions 312A and 412E. If thick provisioning of the additional region is performed, the mapping system 320 responds to the instruction to extend the first tier by mapping the additional slabs R and S to respective storage slabs c3 and c4 of the storage system 330C that provides storage having a trait set that is consistent with the first tier trait set. Any tier in the volume can thus be extended through thick provisioning as long as there is compatible underlying storage available to support the extension.

This mapping operation results in any file system write operation to a logical address within a volume slab in the volume 311' being translated to a write request to the corresponding physical address in the corresponding mapped storage slab. If the volume slab is only thinly provisioned, the write request also results in the mapping of that volume slab to a consistent storage slab. If the file system issues a read operation for a logical address within a volume slab in the volume 311', the mapping results in the read request from the corresponding physical address in the corresponding mapped storage slab.

Accordingly, the volume system 302 is an effective mechanism for providing a heterogenic volume to the file system, allowing intelligent decision making to appropriately place file system namespaces (such as directories or files) or even portion of files in an appropriate tier of the namespace. The appropriate trait set for a given file system namespace, or portion thereof, may change in response to dynamic conditions, resulting in the file system moving the file system namespace, or portions thereof, from tier to tier so long as trait guarantees for that file system namespace are honored.

Having described an example of volume system 202 with respect to FIGS. 3 and 4, an example operation of file system 201 will now be described with respect to FIGS. 5A, 5B and 6. Thereafter, an example operation of the provisioning system 203 will be described with respect to FIGS. 7 through 12.

Figure 5A:
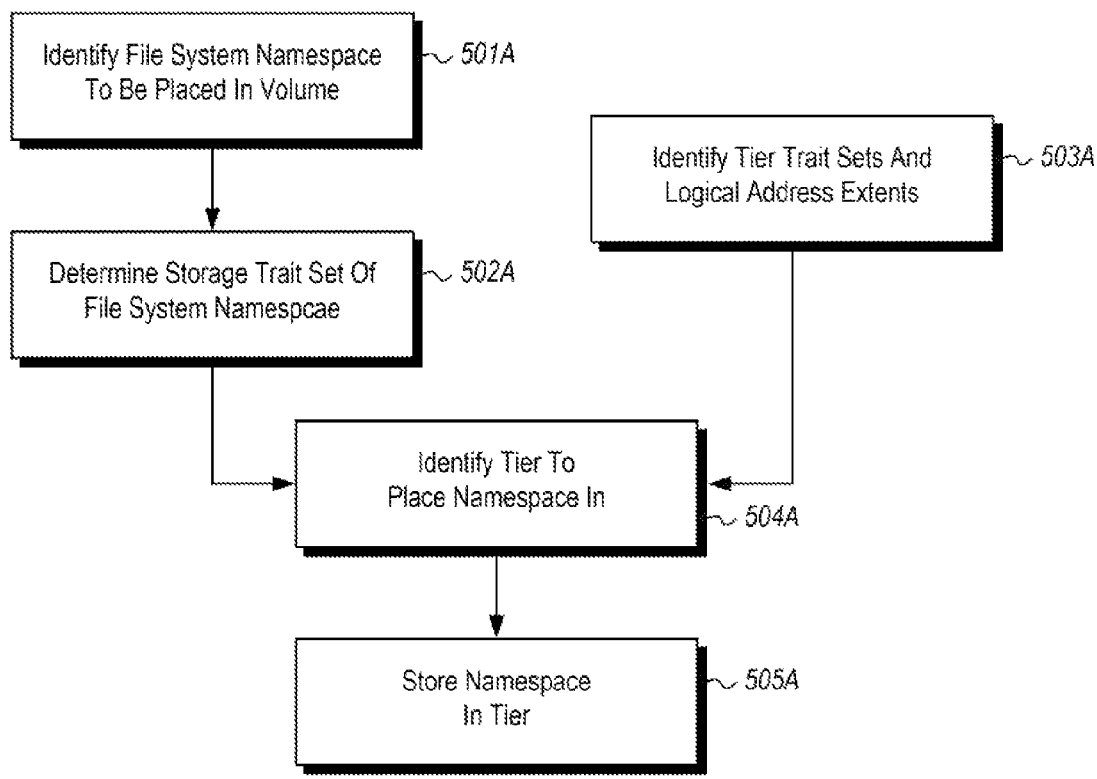
FIG. 5A illustrates a flowchart of a method for the file system to operate to place a file system namespace into a volume.
Figure 6:
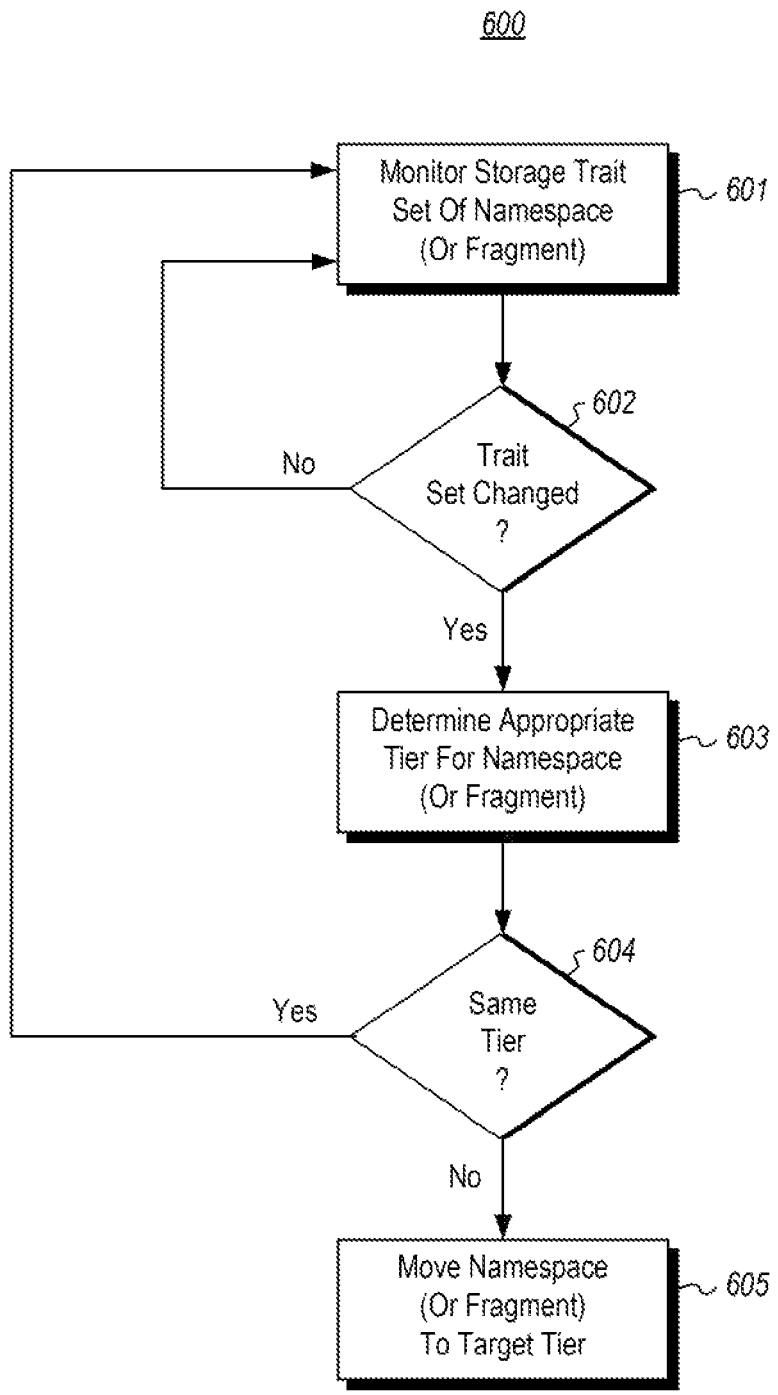
FIG. 6 illustrates a flowchart of a method for a tier engine to move a file system namespace (or fragment thereof) based on dynamically changing traits of the file system namespace or fragment thereof.

FIG. 5A illustrates a flowchart of a method 500A for operating a file system to place a file system namespace in an underlying volume based on a current state of trait sets to be applied to the file system namespace. For instance, the method 500A may be performed by the file system 301 of FIG. 3 on the volume 311 of FIG. 3, and/or on the volume 311' of FIG. 4.

The method 500A includes an act of identifying a file system namespace to be placed in the volume (act 501A). The file system namespace could be, for example, a directory or file. In some embodiments, a portion of a file system namespace might be identified as to be placed in the volume. For instance, this identification (act 501A) might occur when a file system namespace is to be written to the volume.

The method 500A also includes determining a storage trait set corresponding to the file system namespace (act 502A), or in other words, determining a storage trait set to be applied to the file system namespace when placing the file system namespace into the volume. For instance, in an example provided herein (hereinafter referred to as the "subject example"), suppose that the file system namespace is a file that has just been created, and that the file is to be encrypted. The file system would thus determine that an encryption storage trait is to be applied to the file in storage.

The storage trait set to be applied to any given file system namespace may be determined by the file system 201, by the provisioning system 203, or by the combination of file system 201 and provisioning system 203 using communications 232.

The storage trait set may be decided in response to user input. For instance, the user might expressly state a desired storage trait, and perhaps whether the desired storage trait is mandatory or optional. For instance, in the subject example, suppose the user stated that the file is to have a mandatory storage trait of encryption and an optional compression storage trait.

The user might also express more general goals for the file system namespace. For instance, in the subject example, perhaps the user specified that the primary goal of storage is to keep the information in the file from being discovered, but also expressed a secondary goal to keep the size of the file below a certain threshold. Based on these stated goals, and given the size of the uncompressed file, the file system 201 and/or the provisioning system 203 may assign the mandatory encryption storage trait and the optional compression storage trait to the file.

The file system also identifies a trait set and logical address extent for each of the tiers within the volume (act 503A). For instance, as previously described with respect to FIGS. 3 and 4, the file system is provided with metadata 305 either in a push fashion (such as when the volume is created or extended) and/or in a pull fashion (e.g., in response to a query from the file system 301 to the volume system 302 when a volume is created or extended). The act of identifying the trait set and logical address extend for each tier (act 503A) is shown in parallel with the identifying of a file system namespace (act 501A) and its associated trait set (act 502A), because the metadata 305 may be acquired by the file system 301 at any time, even perhaps well before the file system namespace is identified.

There are a number of different ways that the trait set for each tier may be represented in the metadata 305. In one embodiment, the trait set is expressly enumerated for each tier. In another embodiment, some inheritency is employed to represent the trait set in a more compressed form. For instance, based on inheritency rules, a particular tier might inherit traits from volume level traits.

Using this information, the file system 301 and/or the provisioning system 303 may then identify the particular tier of the volume into which to store the file system namespace (act 504A). This may be performed based on matching the storage trait set of the file system namespace with trait sets of identified tiers (act 504A) to find all those tiers for which there are consistent trait sets with the storage trait set of the file system namespace.

For instance, consider again the subject example in which the storage trait set of a file to be stored includes a mandatory encryption storage trait, and an optional compression storage trait. Now suppose the first tier provides encryption and compression, and the second tier provides encryption only. Both the first and second tiers would then have trait sets that are compatible with the trait set of the file system namespace. In this case, the file system would choose the first tier to store the file into.

Consider again the subject example in which there is only one tier which provides encryption (but not compression), and only one other tier offers compression (but not encryption). In that case, the file system and/or the provisioning system might choose the tier that provides encryption (but not compression) since encryption is a mandatory trait of the file, and compression is only an optional trait of the file.

Consider a final example in which there are no tiers that perform encryption. In this case, the file system and/or the provisioning system might respond to such a failure by performing any appropriate action such as 1) notifying the user that file storage has failed, and requesting whether to change the traits or goals for the file, or 2) saving the file in the best matched tier, but notifying the user of the suboptimal storage, and requesting whether the storage should be cancelled.

One possible methodology for finding a best matched tier is as follows, although the principles described herein are not limited to any particular mechanism for finding a tier that matches the trait set for a file. According to this example methodology, the trait set of the file (the "file trait set") is compared against the trait set offered by the tier (the "tier trait set"). If there is an exact match between the file trait set and the tier trait set, with no additional trait offered in the tier trait set, that that tier is selected as the target for the file. If no such tiers exist, then the tier is selected that is an exact match between the file trait set and the tier trait set, but with the fewest additional traits offered in the tier trait set. In case of a tie, the tier with the most available blocks is selected.

If there is not an exact match between the file trait set and the tier trait set, the tier with the most matching tier traits is selected, which tier has no additional trait offered in the tier trait set. If no such tier exist, then the tier is selected that has the most matching tier traits, but with the fewest additional traits offered in the tier trait set. Again, in case of a tie, the tier with the most available blocks is selected.

The goal of a best match algorithm is not only to provide a good matching tier in which to place the file, but also to provide predictable behavior. The motivation behind choosing an exact match with the fewest amount of additional tier traits would be to choose a tier that will have the most predictable behavior based on the desired file trait set. For example, if a volume had two tiers, one with the no seek penalty trait, and another with the no seek penalty trait and an encryption trait, but the file only requires the no seek penalty trait, then it may be best to choose the tier with only the no seek penalty trait, since encryption requires significant processing and might diminish the performance benefit sought by the no seek penalty trait.

Once an appropriate tier for storing the file system namespace is found (act 504A), the file system 301 causes the file system namespace to be stored in the appropriate tier act 505A).

Figure 5B:
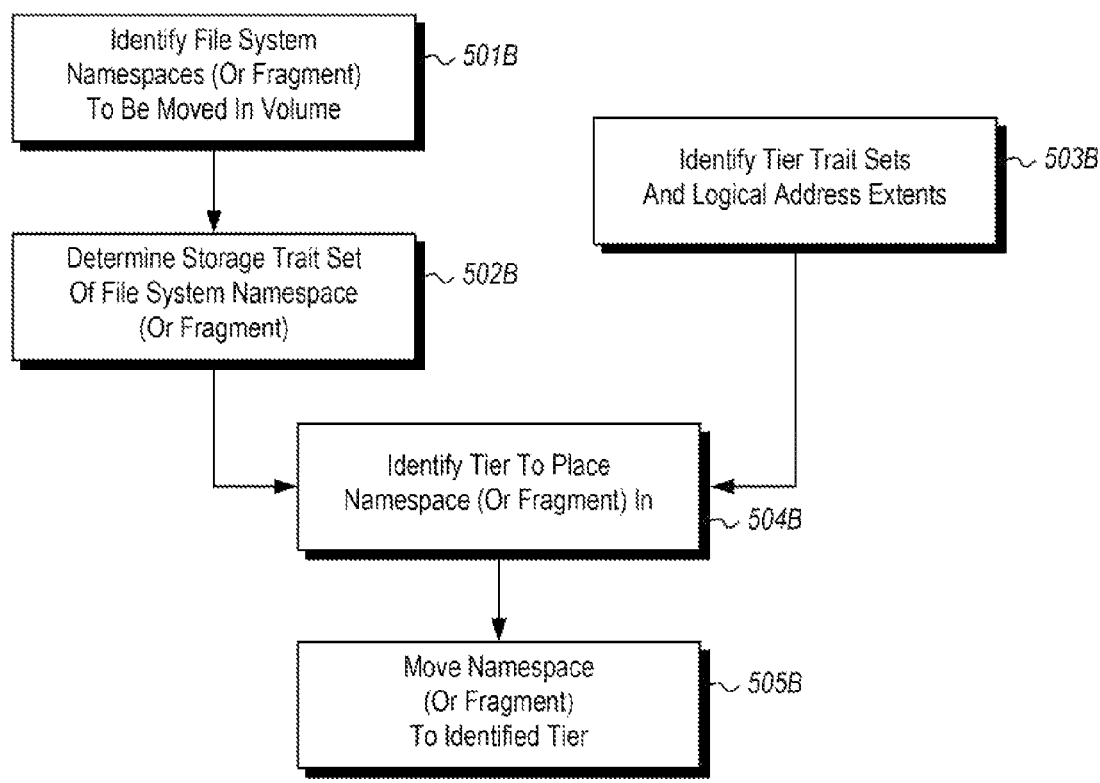
FIG. 5B illustrates a flowchart of method for the file system to operate to move a file system namespace (or fragment thereof) within the volume.

FIG. 5B illustrates a flowchart of a method 500B for operating a file system to move a file system namespace from one tier to another in a volume based on a current state of trait sets to be applied to the file system namespace. Some of the acts within method 500B are quite similar to the acts of method 500A. Again, the method 500B may be performed by the file system 301 of FIGS. 3 and 4.

The method 500B includes an act of identifying a file system namespace to be moved (act 501B). The file system namespace could be, for example, a directory or file. In some embodiments, a portion of a file system namespace might be moved in the volume. The method 500B also includes determining a storage trait set corresponding to the file system namespace (act 502B), which may be performed in a similar manner to the act 502A of FIG. 5A. The file system also identifies a trait set and logical address extent for each of the tiers within the volume (act 503B), which may be similar to act 503A of FIG. 5A. Using this information, the file system 301 (or logic accessible to the file system 301) may then identify the particular tier of the volume into which to move the file system namespace (act 504B) based on matching the tier trait set with the file system storage trait set. The file system 301 then causes the file system namespace to be moved to the identified tier (act 505B).

The file system 301 also includes a tier engine that monitors file system storage trait sets dynamically. The tier engine 306 is capable of moving at the granularity of a portion of a file in response to one or more of the trait sets of the file segment changing. FIG. 6 illustrates a flowchart of a method 600 for moving a file system namespace or portion thereof in the volume in response to changing traits of the file system namespace.

The tier engine monitors the trait set (act 601) of the file system namespace or fragment thereof. If the trait set has not changed ("No" in decision block 602), the tier engine performs no movement and monitoring continues (act 601). If the trait set does change ("Yes" in decision block 602), the tier engine then determines the most appropriate tier to which to move the file system namespace or fragment thereof (act 603). This may be performed in a very similar manner as for acts 504A and 504B based on matching the trait set of the file system namespace or fragment thereof to each tier trait set. If the best tier is the same tier that the file system namespace or fragment is presently located in ("Yes" in decision block 604), no movement is performed, and the monitoring continues (act 601). If the best tier for the file system namespace or fragment thereof is a different tier ("No" in decision block 604), the tier engine causes the file system namespace or fragment thereof to be moved to the target tier (act 605). The tier engine may perform this monitoring continuously, periodically, and/or in response to events for multiple file system namespaces and multiple fragments. Thus, the tier engine moves file system namespaces (or fragments) in a manner that honors the storage trait set to be applied to the corresponding file when moving the file or the file fragment to a target tier, wherein the target tier also provides storage having a trait set consistent with the trait set to be applied to the corresponding file or file fragment Example operation of a provisioning system 203 will now be described with respect to FIGS. 7 through 12. Referring again to FIG. 2, the provisioning system 203 includes a volume provisioning component 221, a file system namespace provisioning component 222, an extension component 223, and a monitoring component 224. Example operations of each of these components will now be described.

Figure 7:
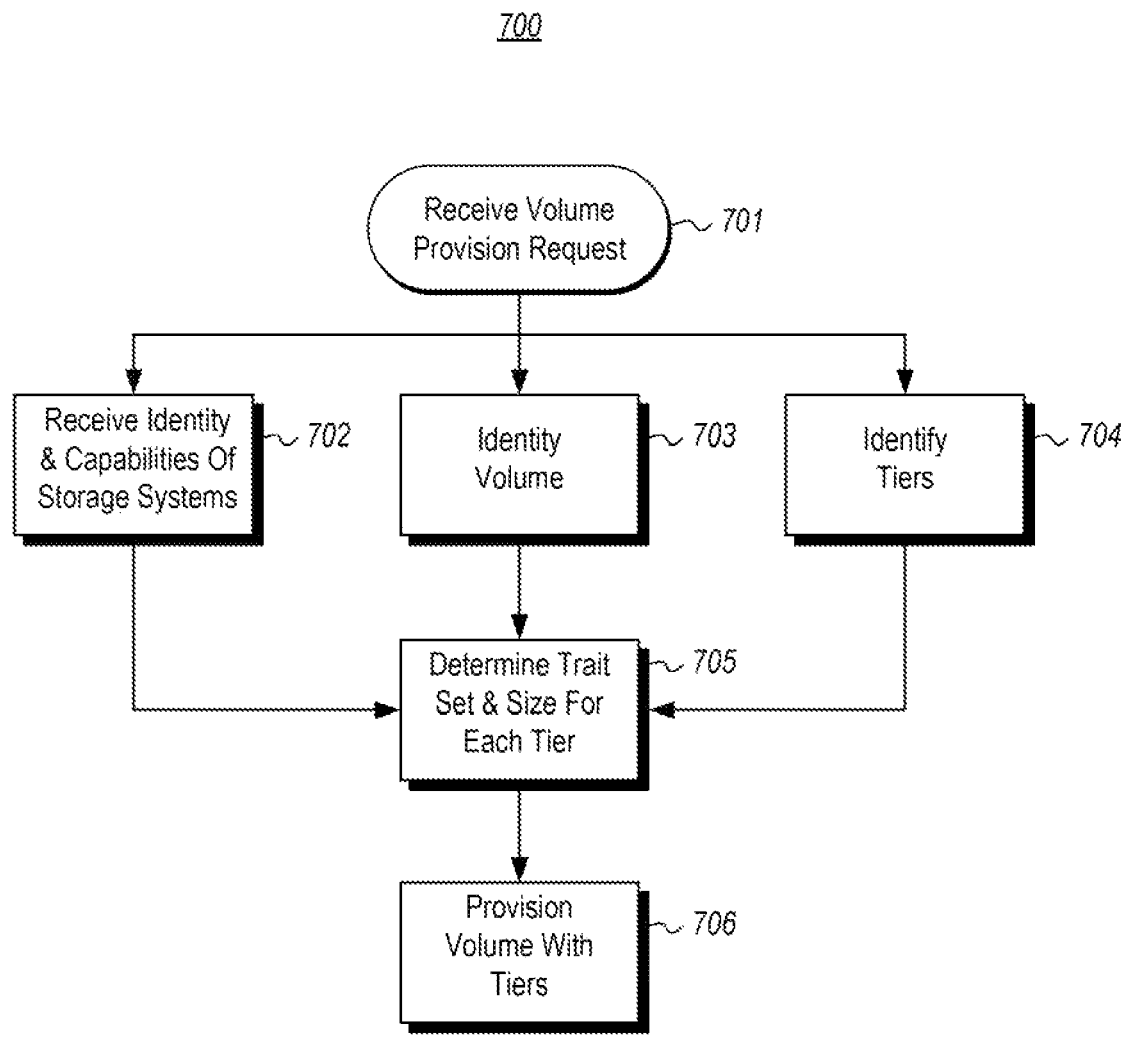
FIG. 7 illustrates a flowchart of a method for provisioning a volume that has multiple tiers corresponding to different trait sets, which may be performed by the volume provisioning component of FIG. 2.

FIG. 7 illustrates a flowchart of a method 700 for provisioning a volume that has multiple tiers corresponding to different trait sets. The method 700 may be performed by, for example, the volume provisioning component 221 of FIG. 2 in order to provision the volume 211.

The method 700 is initiated upon receiving a request to provision a volume to be made and exposed to a particular file system (initiating act 701). As an example, the provisioning system 203 might receive a request to provision a volume to be exposed to the file system 201. The provisioning system 203 knows the file system 201 is operating within the volume system 202. Thus, the provisioning system 203 communicates with the volume system 202 in order to complete the provisioning. This communication is represented as communication 231 in FIG. 2.

Optionally, the volume provisioning component 221 takes as input the identification and capabilities of the various underlying storage systems 213 that are available to support the volume (act 702). For instance, the volume provisioning component 221 might query the volume system 202 so that this input could be acquired regarding the storage systems 213, and their capabilities (such as the total available storage provided in each storage system, how much storage remains unmapped in each system, and the trait sets offered by each storage system).

The volume provisioning component 221 also provides an identifier for the volume (act 703), and provides an identifier for each tier that is to be created in the volume (act 704). There is no particular ordering requirement between acts 702 through 704, and thus they are shown in parallel to symbolize this temporal independence.

The volume provisioning component 221 then determines a trait set and size to be applied to each of the identified tiers (act 705). For instance, the volume provision request may identify user input regarding the mandatory or optional storage traits for each of the tiers, and/or specify primary or secondary goals for the tier. The provision request might also specify a size for each tier, and perhaps specify a level of flexibility regarding that size. For instance, the user might specify that the tier is mandatorily a certain size, or perhaps can vary a certain amount or percentage from a particular size. The user might also specify that the tier should be as large as possible (e.g., given the available storage systems).

The volume provisioning component 221 may take this input, and any other information it is able to acquire from the system (such as the trait sets offered by the available storage systems) to determine the trait sets and size of each tier (act 705). Taking into account any flexibility provided in the original provisioning request, if there still is not enough available storage systems to thickly provision the entire volume based on the request, the volume provisioning system might thinly provision or partially thickly provision one, some, or all of the tiers. If the request does not provide enough flexibility to thinly provision, or partially thickly provision a certain tier, and there are not enough storage systems to provide for thick provisioning, the volume provisioning system may fail the provisioning request, and/or otherwise prompt the user to add storage systems having certain storage traits.

The volume provisioning component 221 may then cause the volume to be provisioned with the identified tiers, each having the determined size and trait sets (act 706). For instance, the volume provisioning component 221 may instruct the volume system 202 to create the volume. Extending a volume by adding a tier may be performed in a similar manner as described above for provisioning the volume.

Figure 8:
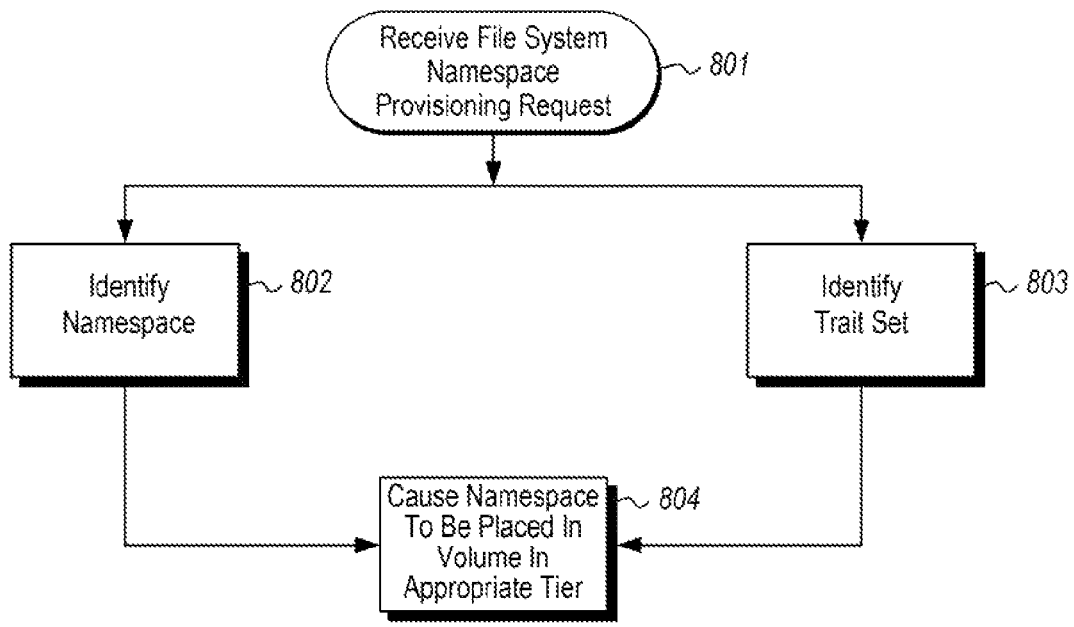
FIG. 8 illustrates a flowchart of a method for responding to a request to provision a file system namespace, which may be performed by the file system namespace provisioning component of FIG. 2.

The provisioning system 203 may also perform file system namespace provisioning using, for example, file system namespace provisioning component 222. FIG. 8 illustrates a flowchart of a method 800 for responding to a request to provision a file system namespace, that may be performed by, for example, the provisioning component 222 of FIG. 2. The method 800 is initiated upon receiving a request to provision a file system namespace (initiating act 801).

The file system namespace provisioning component 222 identifies the file system namespace (act 802), and also identifies one or more storage traits to be applied to the file system namespace (act 803). For instance, the file system namespace provisioning component 222 may identify the storage trait set for the namespace by receiving user input, or detecting other system conditions or information. The acts 802 and 803 are shown in parallel to show that there is no temporal ordering required between the acts.

The file system namespace provisioning component 222 then causes the file system namespace to be stored in the volume in an appropriate tier that has a consistent trait set (act 804). For instance, the file system namespace provisioning component 222 may provide the namespace identifier and trait set to the file system 201 and allow the file system to make the decision on which tier to place the file system namespace in.

Figure 9:
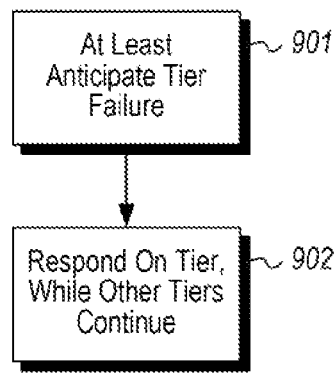
FIG. 9 illustrates a flowchart of a method for monitoring the volume usage after provisioning, which may be performed by the monitoring component of FIG. 2.

The provisioning system 203 may also perform monitoring of the volume 211 usage using, for example, monitoring component 224. FIG. 9 illustrates a flowchart of a method 900 for monitoring the volume usage after provisioning, which may be performed by, for example, monitoring component 224.

The method 900 involves at least anticipating a failure condition applies to a particular tier of the volume (act 901). In this description and in the claims, "at least anticipating" a tier failure condition means either detecting an active failure condition, or anticipating that a failure condition could occur. Such a failure could be any physical or software failure that threatens the availability of the existing storage system to support the tier, or could be the result of a utilization ratio of the tier rising above a certain level. The monitoring component 224 then responds to the at least anticipated failure condition (act 902) while allowing a remaining one or more other tiers of the plurality of tiers to continue operating.

As examples of responses, the monitoring component 224 might notify the user of the potential failure, and if there is something the user can do about the problem, prompt the user to take specific action. For instance, if an underlying storage system is beginning to fail, the monitoring component 224 may cause the user to be notified of the same.

The monitoring component 224 might even be able to automatically take action on the failure even without user intervention. For instance, suppose that there was only a small amount of space left in a particular tier. The monitoring component 224 might take a number of actions to address this depending on the circumstances. As an example, the monitoring component 224 might cause the volume system 202 to take space from another tier by, for example, mapping an unmapped volume slab (or re-mapping an empty volume slab) of another tier to the problem tier. The monitoring component 224 might also extend the tier by extending the volume. For instance, volume 311' of FIG. 4 is an extended form of volume 311 of FIG. 3. That extension might have been started by the monitoring component 224 detecting a problem with the first tier (having only first region 312A) approaching saturation. Such might have triggered the extension component 223 to take action, such as the action described with respect to FIGS. 10 and 11.

Figure 10:
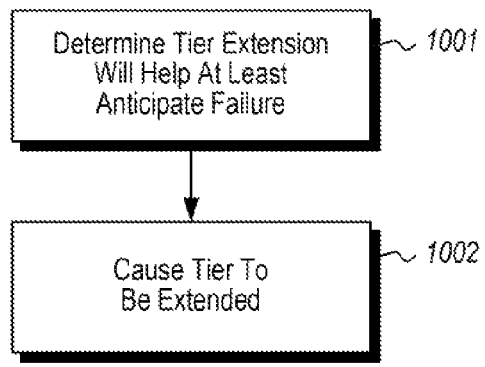
FIG. 10 illustrates a flowchart of a method for provisioning an extension to a particular tier of a heterogenic volume, which may be performed by, for example, the extension component of FIG. 2.

FIG. 10 illustrates a flowchart of a method 1000 for provisioning an extension to a particular tier of a heterogenic volume. The method 1000 may be performed by, for example, the extension component 223 of FIG. 2. The method 1000 might be performed after performance of method 900 results in a determination that extending the particular tier will remove the failure condition if the failure condition is a present failure condition, or will delay or avoid the failure condition if the failure condition is an anticipated failure condition (act 1001). In response, the extension component 223 causes the particular problem tier to be extended with additional logical address space (act 1002).

Again, if the volume is to remain the same size, this may be performed by transferring volume slabs from the underutilized tier to the problem tier, and by remapping the volume slab to a storage slab for a storage system that supports the trait set of the problem tier. Alternatively or in addition, the tier may be extended without affecting the size of the other tiers, in which case the volume is extended. In that case, additional logical address space in the form of additional volume slabs (such as volume slabs R and S in FIG. 4) are allocated to the volume and to the particular tier by causing the additional logical address space to be associated with corresponding physical addresses of an underlying storage system that is consistent with the storage trait set of the particular tier.

Figure 11:
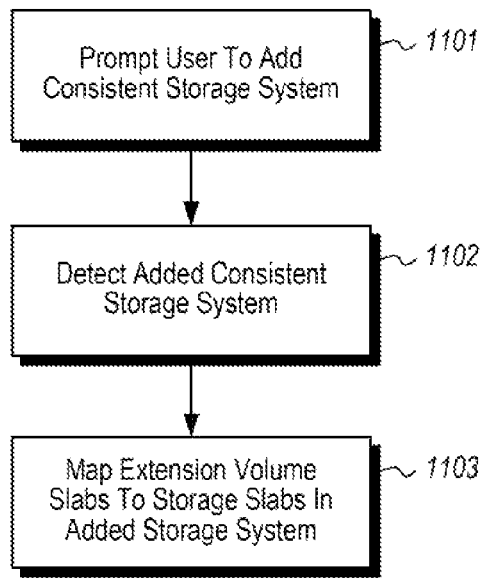
FIG. 11 illustrates a flowchart of a method for thickly provisioning an extension to a particular tier of a heterogenic volume, in the case in which there are no underlying storage systems to support the extension.

If there is not sufficient underlying storage to presently support the extension, and if the extension is to be thickly provisioned, the extension component 223 might perform the method of FIG. 11. FIG. 11 illustrates a flowchart of a method 1100 for causing the particular tier to be extended. The user is prompted to add an underlying storage system that is consistent with the storage trait set of the particular tier (act 1101). Once the addition of such a storage system is detected (act 1102) (e.g., through the user confirming the addition or through automated detection of the storage system), the tier is extended by mapping the added volume slabs to storage slabs within the added storage system (act 1103).

A tier may be also be reduced in size or even removed entirely. To do so, the slabs that are to be removed from the tier (in the case of the tier being reduced in size), or perhaps all of the slabs of the tier (in the case of the tier being entirely removed), are unmapped such that the slabs are no longer supported by underlying storage. If the unmapped slabs are at the end of the volume, the logical address extent of the volume may be reduced to account from the removed slabs.

Figure 12:
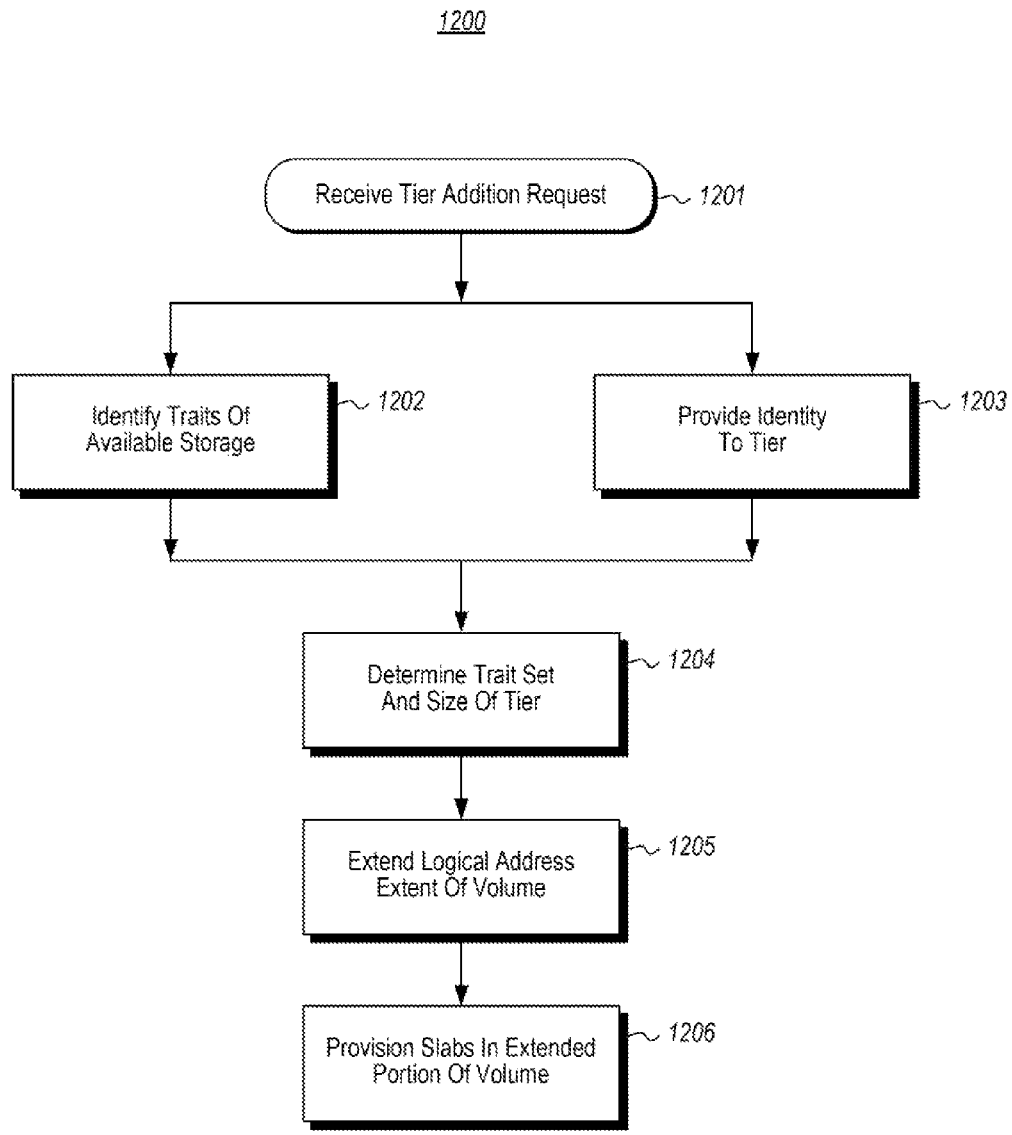
FIG. 12 illustrates a flowchart of a method for adding a tier to an existing volume.

FIG. 12 illustrates a flowchart of a method 1200 for adding a tier to a volume, which is a further way that the logical address extent of the volume may be increased. Recall that the other way that the logical address extent of the volume may be increased is to extend an existing tier. The method 1200 may be performed by, for example, the provisioning system 203.

The method 1200 is initiated upon receiving a request to add an additional tier to the volume (initiating act 1201). The provisioning system 203 again takes as input the identification and capabilities of the various underlying storage systems 213 (act 1202) in a manner that is similar to act 702 described above. The provisioning system further provides an identifier for the tier (act 1203). The provisioning system then determines a trait and size to be applied to the tier (act 1204), which may be performed the same as act 705 described above. The volume provisioning system then communicates this information to the volume system 202. The volume system 202 then extends the logical address extent of the volume by an amount equal to the size of the additional tier (act 1205), and subsequently thinly or thickly provisions each slab in the extended portion of the logical address extent (1206).

Thus, the provisioning system 203 operations in collaboration with the remainder of the system 200 to allow an effective mechanism to provide a heterogenic volume to a file system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method implemented by a computing system for provisioning a volume that has multiple tiers corresponding to different trait sets, the method comprising:
   an act of receiving a provisioning request, the provisioning request identifying storage traits for each of a plurality of different tiers of a volume to be provisioned, the storage traits including one or more mandatory storage traits and one or more optional storage traits;
   for each of the plurality of tiers that are to be provisioned, an act of identifying from the provisioning request a trait set to be applied to each of the plurality of different tiers, wherein a trait set of a first tier in the plurality of different tiers is at least partially different than a trait set of a second tier in the plurality of different tiers;
   an act of querying storage traits of an existing storage system; and
   an act of causing the volume to be provisioned with the plurality of different tiers, using the existing storage system, each tier having the corresponding identified trait set, wherein provisioning the volume further comprises:
      thickly provisioning the volume if it is determined that there is adequate storage in the existing storage system to thickly provision the volume;
      thinly provision the volume or partially thickly provision the volume if it is determined that there is inadequate storage in the underlying storage system to thickly provision the volume and the provisioning request provides flexibility for thinly provisioning at least part of the volume; and
      failing the provisioning request and providing a prompt for new storage to be added to the underlying storage system if it is determined that there is inadequate storage in the underlying storage system to thickly provision the volume and that there is inadequate flexibility in the provisioning request to permit the volume to be thinly provisioned or partially thickly provisioned.

2. The method in accordance with claim 1, further comprising an act of receiving an identification of a plurality of underlying storage systems that are presently available for supporting the volume at the time of the provisioning.

3. The method in accordance with claim 1, wherein further comprising an act of receiving an identification of a plurality of underlying storage systems, at least some of which anticipated to be made available for the volume after the provisioning, wherein at least some of the logical addresses within the extent of the volume are to be thinly provisioned.

4. The method in accordance with claim 1, further comprising:
an act of reducing a size of one of the plurality of tiers by unmapping a plurality of slabs from the tier.

5. The method of claim 1, further comprising:
an act of identifying one or more storage traits to be applied for a file; and
an act of causing the file to be stored in a volume.

6. The method in accordance with claim 5, wherein the act of causing the file to be stored in the volume further comprises:
an act of instructing a file system to place the file in the volume in a location in which the one or more storage traits is applied for the file.

7. The method in accordance with claim 6, further comprising:
an act of at least anticipating that a failure condition applies to a particular tier of the plurality of different tiers; and
an act of responding to the at least anticipated failure condition while allowing a remaining one or more other tiers of the plurality of different tiers to continue operating.

8. The method of claim 7, wherein the act of responding comprises:
an act of determining that extending the particular tier will remove the failure condition if the failure condition is a present failure condition, or will delay or avoid the failure condition if the failure condition is an anticipated failure condition; and
an act of causing the particular tier to be extended with additional logical address space.

9. The method of claim 8, wherein the act of causing the particular tier to be extended comprises an act of causing a remapping of a logical address space of the volume from an unused portion of tier of the plurality of tiers to the particular tier of the plurality of tiers and by causing the additional logical address space to be associated with corresponding physical addresses of an underlying storage system that is consistent with the storage trait set of the particular tier.

10. The method in accordance with claim 5, wherein the one or more storage traits comprises type of an underlying storage system.

11. The method in accordance with claim 5, wherein the one or more storage traits comprises a relative storage access speed.

12. The method in accordance with claim 5, wherein the one or more storage traits comprises a relative latency.

13. The method in accordance with claim 5, wherein the one or more storage traits comprises a resilient configuration.

14. The method in accordance with claim 5, wherein the one or more storage traits comprises a remote-replicated status.

15. The method in accordance with claim 5, wherein the one or more storage traits comprises a volatility status.

16. The method of claim 8, wherein the act of causing the particular tier to be extended comprises an act of causing an additional logical address space to be allocated to the volume and to the particular tier by causing the additional logical address space to be associated with corresponding physical addresses of an underlying storage system that is consistent with the storage trait set of the particular tier.

17. The method of claim 8, wherein the act of causing the particular tier to be extended comprises:
an act of prompting a user to add an underlying storage system that is consistent with the storage trait set of the particular tier;
an act of determining that an underlying storage system has been added that is consistent with the storage trait set of the particular tier; and
an act of causing the additional logical address space to be associated with corresponding physical addresses of an underlying storage system that is consistent with the storage trait set of the particular tier.

18. A computer system comprising:
one or more processors; and
one or more storage device having stored computer-executable instructions which, when executed by the one or more processors, cause the computing system to:
receive a provisioning request, the provisioning request identifying storage traits for each of a plurality of different tiers of a volume to be provisioned, the storage traits including one or more mandatory storage traits and one or more optional storage traits;
for each of the plurality of tiers that are to be provisioned, identify from the provisioning request a trait set to be applied to each of the plurality of different tiers, wherein a trait set of a first tier in the plurality of different tiers is at least partially different than a trait set of a second tier in the plurality of different tiers;
query storage traits of an existing storage system; and
provision the volume with the plurality of different tiers, using the existing storage system, each tier having the corresponding identified trait set, wherein the computer-executed instructions are further executable for configuring the computing system to;
thickly provision the volume if there is adequate storage in the existing storage system to thickly provision the volume;
thinly provision the volume or partially thickly provision the volume if there is inadequate storage in the underlying storage system to thickly provision the volume and the provisioning request provides flexibility for thinly provisioning at least part of the volume; and
fail the provisioning request and to provide a prompt for new storage to be added to the underlying storage system if it is determined that both (1) there is inadequate storage in the underlying storage system to thickly provision the volume and (2) that there is inadequate flexibility in the provisioning request to allow the volume to be thinly provisioned or partially thickly provisioned.

19. The computer system of claim 18, wherein the storage traits included within the provisioning request specify a tier size and a flexibility of the tier size for each of the plurality of different tiers of the volume to be provisioned.

* * * * *